Feb. 23, 1937. C. P. LARRABEE 2,071,697
VOLUMETRIC ANALYSIS APPARATUS
Filed Sept. 12, 1932
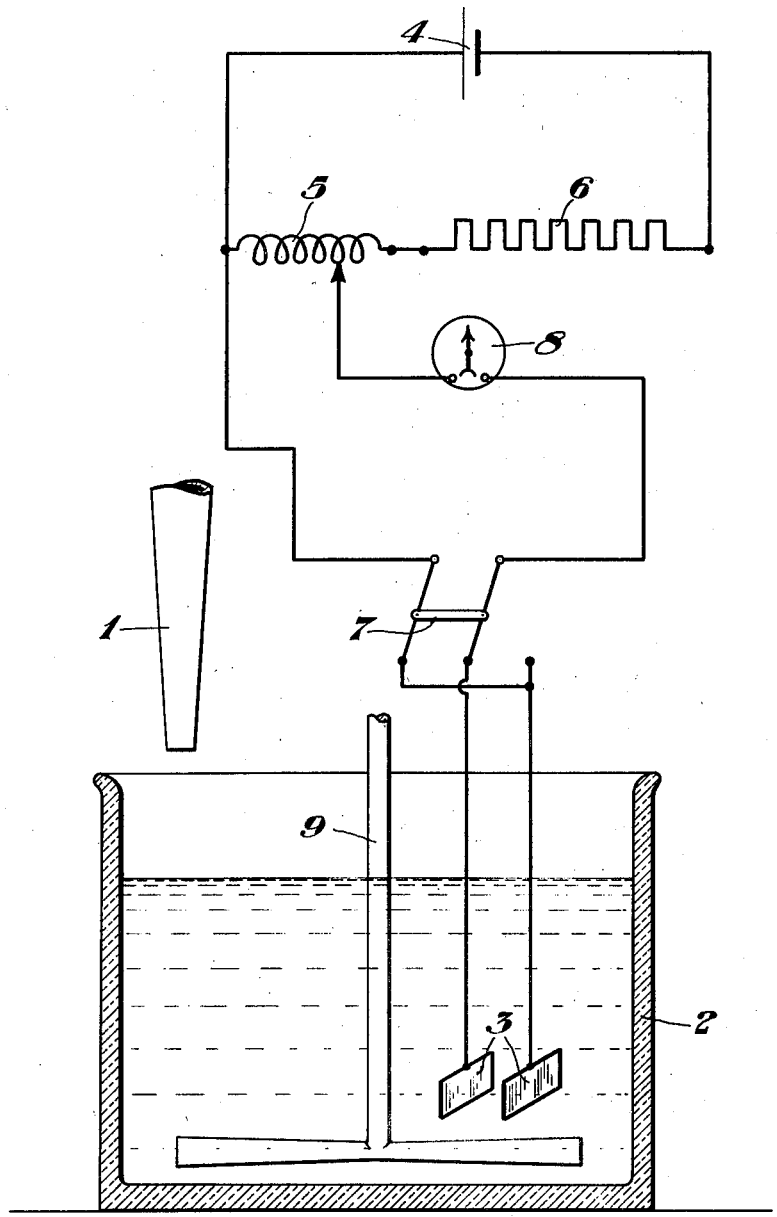
Inventor:
CLIFFORD P. LARRABEE.
by
Usina &Lauber
his Attorneys Patented Feb. 23, 1937

2,071,697

UNITED STATES PATENT OFFICE 2,071,697

VOLUMETRIC ANALYSIS APPARATUS

Clifford P. Larrabee, Pittsburgh, Pa.

Application September 12, 1932, Serial No. 632,869

2 Claims. (Cl. 175—183)

This invention relates to the analysis of various compounds by volumetric methods, one of the objects being to exactly determine titration end points in oxidation-reduction reactions. Generally speaking, it consists in maintaining a pair of electrodes immersed in and in direct contact with the sample fluid being titrated. The resulting electromotive force between these electrodes is then balanced by another of equal strength. When the end point is reached this balance is upset and this point is observed by means of a suitable electric flow indicator included in the circuit. The titration is then immediately stopped.

The accompanying drawing illustrates an example of the invention when set up particularly for the determinaton of manganese. It shows the bottom end of a burette 1 which drops its contents into a beaker 2 containing the sample fluid. Electrodes 3 are arranged in this beaker 2 so as to be immersed in the fluid. An electromotive force between these electrodes is naturally created.

This force may be balanced by an electric cell 4 through suitable apparatus. In the present instance a 400 ohm potentiometer 5 is connected to the cell through a resistance 6 of 2000 ohms, it being assumed that the cell 4 produces about 1.5 volts.

This potentiometer is connected to the electrodes 3 through a pole changing switch 7 and a galvanometer 8. With the values just indicated, this galvanometer should have a sensitivity of about .125 microampere. It is to be understood that all values are advanced merely in a suggestive manner.

The electrodes 3 are preferably made of pure gold and platinum respectively as these substances are chemically inactive with the solvents ordinarily used. They must not be so small that they will become polarized by the current flowing through the galvanometer. For instance, they may have an area of .25 square inch when located not more than .25 of an inch apart. These dimensions are particularly applicable to the apparatus being specifically disclosed but may be varied should the circumstances warrant. To prevent gases forming on these electrodes in minute bubbles it is best to provide a mechanically operated stirrer or agitator 9 for the sample fluid.

Assuming that titration is actually going on and that it is suspected that a close approach to the end point is being reached, the apparatus just described is operated as follows.

The potentiometer 5 is operated until the galvanometer 8 indicates that the external electromotive force is properly balanced against that between the electrodes 3. If this cannot be done at first, polarity is reversed by means of the switch 7 and a balance then obtained.

As the burette 1 continues to drop the titrating solution into the sample fluid it is possible that the galvanometer shows that the balance is being affected somewhat. When this occurs, time is given for steadiness to be re-established before another drop is allowed to fall into the beaker 2. The moment the galvanometer indicates a complete unbalance will be one when the end point is reached and titration should accordingly be stopped.

In cases where the galvanometer indicates that a slight unbalance results from titration it will be found that when the end point is reached the unbalance will be of opposite polarity to these slight departures. It is to be understood that in practicing this invention, the analysis is carried out according to the usual volumetric methods, except as indicated by the foregoing. That is, the metal will be carried by a suitable solvent and the titrating fluid will, in all probability, be sodium arsenite. The results obtained with this invention are, however, found to be more accurate because of the difficulties in accurately ascertaining the end point by means of the change in color of the solution.

Thus, for example, in the determination of manganese by sodium arsenite, 20 milligrams of manganese is the largest amount that may be determined by visible titration. When more than this amount of manganese is present the brown color resulting from products of reduction totally obscures the correct end point. By using the same method but by my above described apparatus as high as 500 milligrams of manganese have been titrated to an accurate end point.

I claim:

1. Apparatus for determining the titration end point during a volumetric analysis, including the combination of a pair of electrodes, one of said electrodes being made of gold and the other of said electrodes being made of platinum, means including a galvanometer for indicating a sustained flow of electricity between said electrodes after the end point of titration is reached, said galvanometer having a sensitivity of around about .125 microampere, said electrodes each being not less than .25 square inch in area and separated not more than .25 of an inch, or being of proportionate areas and proportionately separated.

2. Apparatus for determining the titration end point during a volumetric analysis, including the combination of a pair of electrodes, one of said electrodes being made of one metal and the other of said electrodes being made of another metal dissimilar to that of the first named electrode, both of said metals being chemically inactive respecting the titration solvents used, means including a galvanometer for indicating a sustained flow of electricity between said electrodes after the end point of titration is reached, said galvanometer having a sensitivity of around about .125 microampere, said electrodes each being not less than .25 square inch in area and separated not more than .25 of an inch, or being of proportionate areas and proportionately separated.

CLIFFORD P. LARRABEE.